United States Patent [19]

Mittal

[11] Patent Number: 5,540,268

[45] Date of Patent: *Jul. 30, 1996

[54] APPARATUS FOR REPEATABLE ADJUSTMENT OF TIRE PRESSURE

[76] Inventor: Chander Mittal, 2363 S. Arcdale Ave., Rowland Heights, Calif. 91748

[*] Notice: The portion of the term of this patent subsequent to May 10, 2011, has been disclaimed.

[21] Appl. No.: 238,251

[22] Filed: May 4, 1994

Related U.S. Application Data

[63] Continuation-in-part of Ser. No. 809,584, Dec. 17, 1991, Pat. No. 5,309,969.

[51] Int. Cl.$^6$ ............................................ B60C 23/00
[52] U.S. Cl. ............................................ 152/415
[58] Field of Search .................... 152/415, 416, 152/417; 141/4, 38, 95, 195, 197

[56] References Cited

U.S. PATENT DOCUMENTS

| | | | |
|---|---|---|---|
| 3,805,912 | 4/1974 | Mattson et al. | 152/416 X |
| 4,456,038 | 6/1984 | Gwaltney et al. | 141/95 |
| 4,754,792 | 7/1988 | Braun et al. | 152/417 |
| 4,763,709 | 8/1988 | Scholer | 152/416 |
| 4,782,878 | 11/1988 | Mittal | 152/417 |
| 4,783,993 | 11/1988 | Lothar et al. | 73/146.5 |
| 4,883,105 | 11/1989 | Schultz | 152/416 |
| 5,309,969 | 5/1994 | Mittal | 152/415 |

*Primary Examiner*—Geoffrey L. Knable
*Assistant Examiner*—Francis J. Lorin
*Attorney, Agent, or Firm*—J. E. Brunton

[57] ABSTRACT

An apparatus for adjusting and controlling air pressure in pneumatic vehicle tires. The apparatus, which is microcomputer based, automatically checks tire pressure, checks for tire and system leaks and controllably inflates and deflates the tires as conditions warrant. The apparatus also includes unique tire inflation valves which are designed to accommodate high levels of particulate contamination within the system.

2 Claims, 4 Drawing Sheets

APPARATUS FOR REPEATABLE ADJUSTMENT OF TIRE PRESSURE

BACKGROUND OF THE INVENTION

This is a continuation-in-part application of U.S. Ser. No. 07/809,584 which was filed Dec. 17, 1991, now U.S. Pat. No. 5,309,969.

FIELD OF THE INVENTION

The present invention relates generally to a method and apparatus for monitoring and controlling air pressure in pneumatic vehicle tires. More particularly, the invention concerns an improved apparatus for automatically checking tire pressure, checking for tire and system leaks, and for controllably inflating and deflating the tires as conditions warrant.

DISCUSSION OF THE INVENTION

Various types of systems have been suggested in the past for controllably inflating and deflating vehicle tires during vehicle operation. Such systems typically include a source of air under pressure and controls for selectively increasing or decreasing an existing tire pressure, and for checking to determine the existing tire pressure for each tire. The ability to selectively increase or decrease tire pressure is desirable in connection with optimizing the operation of the vehicle under widely changing conditions including weather, vehicle load, terrain, and vehicle speed. It is also desirable to provide adaptability for isolating the air under pressure in each vehicle tire from the remainder of the system so that a problem such as a leak in one tire does not affect the air pressure in the other tires. Further, in connection with such a tire isolating feature, an air line from the system's source of air under pressure extends to a vehicle tire generally through the fixed axle upon which the tire and its associated wheel assembly are rotatably mounted and across a sealing arrangement between the fixed and rotating parts. The tire isolating valve is preferably between the sealing arrangement and tire so that the sealing arrangement is not subjected to system air under pressure other than at times of operation of the system to accomplish inflation, deflation or pressure checking.

Problems encountered in connection with prior art systems of the foregoing character, have included the inability to detect flat tires and to accurately obtain a predetermined desired tire pressure during inflation or deflation. Other problems have included the inability to achieve inflation or deflation from one tire pressure to another with accuracy, and within a reasonable time period. The inability to provide a system which is efficient in operation both from the standpoint of minimizing operator involvement and of obtaining both the required accuracy and the achievement of rapid inflating and deflating rates. A further problem with the prior art systems is to effectively prevent system failure due to contamination of control valves and other pneumatic devices by rubber, dust and other contaminates present in the air system and routinely encountered during vehicle operation.

Efforts to improve accuracy have included the use of complex flow control valves and very slow flow rates of air between the source of air and the vehicle tires. However, such efforts undesirably result in the inability to achieve tire inflating or deflating within a reasonable time period. Moreover, complex flow control valves or valve orifice arrangements are not very effective and undesirably expensive both to manufacture and to maintain, because small orifices tend to clog and are subjected to wear for reasons of high fluid velocities.

One of the most successful pressure monitoring systems ever devised is described in U.S. Pat. No. 4,782,878, issued to the present inventor. While this system was vastly superior to the prior art systems which preceded it, the system was not able to achieve the high levels of precision and control required in many applications as for example, in certain military applications. Additionally, because the system was primarily analog based, the severe size and weight limitations required in many end-use applications made it inherently unable to provide the flexibility, versatility and accuracy desired.

For example, one aspect of the earlier system which contributed to a lesser degree of accuracy than is achievable by the present system is the fact that measurement of tire pressure in the earlier system was, of necessity, made immediately after the primary control valves were closed and before the system could fully stabilize. This requirement for measurement of the tire pressure prematurely and while the system was in flux resulted because the earlier system had no provision for stabilizing the system pressure prior to processing the transducer output signal. The prior system also lacked the important tire pressure equalizing feature which is present in the invention presently to be described. Absence of this feature further contributed to a lesser degree of overall accuracy.

Another important feature which is present in the present system but was lacking in the prior system relates to the ability of the apparatus of the present invention to detect both a flat tire and any system leakage. Such a feature is highly desirable if not mandatory from a vehicle safety standpoint.

Also absent in the prior system was the ability to properly accommodate high levels of particulate contamination. Field experience has shown that vehicles that are operated with variable tire pressure generate substantial rubber dust in the tires when the tire side walls are folding and unfolding. In fact, it is quite common to generate between one and two cups of this dust between tire changes. This pneumatic valve dust travels to the tire isolating valves and their operation mechanisms causing them to jam or stick. This serious problem is effectively solved in the apparatus of the present invention through a unique electronic modulation of all of the pneumatic valves. This modulation is of a character to create a controlled jarring action at the valves which effectively prevents moving components including valve poppet sticking and jamming due to particulate contamination.

There is also no provision in the prior art system for a variable inflate or deflate orifice which comprises an important element of reduction in total inflate or deflate times optimized to the application and the apparatus. In the present device, modulation of all pneumatic valves provides the effect of a variable orifice and both the frequency and characteristic of modulation as controlled by the software program of the system is utilized to achieve optimized flow rates and thus the reduction in both the inflation and deflation times.

All prior art automatic control systems also suffer from a control phenomena called "hunting around the set point" which means that the system in its pressure adjustment cycle will either overshoot or undershoot the desired set point pressure generating wasteful excursions of the pressure adjustment cycle, before settling down to the correct pressure. Such systems produce long inflation and deflation times, inaccurate pressure adjustment and reduced reliability of operation. Hysteresis about the set point created due to the usage of spool valves or other types of valving, that has sliding surfaces also adds to such inaccuracies. Valving in the present system incorporates all short stroke diaphragm design valves to minimize the effect of hysteresis. The present system also provides a unique method of eliminating this problem by shutting off the system in the dynamic mode and use the offset correction method to provide an overall improvement in the inflation and deflation times.

In addition to providing superior accuracy, greater versatility, the ability to detect system leaks and the ability to accommodate high levels of particulate system, it will become apparent from the description which follows that the apparatus of the present invention also overcomes numerous other drawbacks found in the prior art systems.

SUMMARY OF THE INVENTION

It is an object of the present invention to provide valuable and heretofore unachievable improvements in an apparatus for inflating, deflating, and checking the pressure of air in the pneumatic tires of a vehicle.

Another object is to provide an apparatus of the foregoing character which has the ability to precisely obtain a predetermined desired pressure in the tires of a vehicle during all operating conditions, including widely varying operating temperatures.

Another object is to provide an apparatus of the foregoing character that optimizes the traction of the vehicle and provides for additional tire pressure settings selectable and responsive to vehicle load.

A further object of the invention is to provide an apparatus of the character described, which enables inflation or deflation from one tire pressure to another in very short time periods, and while the vehicle is traveling at highway speeds.

Another object of the invention is to provide an apparatus as described in the foregoing paragraphs, which effectively detects both flat tires and system leaks.

Another object of the invention is to provide an extremely versatile system which is compact, highly efficient in operation, and one which requires minimal operator involvement in connection with operation of the apparatus.

Another object is to provide an apparatus which has the ability to check for flat tires and system leaks, to determine the existing tire pressure, to very accurately compare the existing pressure with a desired pressure, and to accomplish highly efficient inflating, deflating and pressure checking procedures in response to such comparison.

Another object of the invention is to provide a system, including specially designed wheel valves, which will accommodate severe particulate contamination and will function accurately and reliably even when rubber dust, fibrous contamination and other particulates invade the system during vehicle operation.

Still another object is to provide an apparatus of the character described, which includes a microprocessor based electronic controller with a removable and replaceable EPROM, loaded with the appropriate software program that controls all the apparatus hardware and the cab mounted display in a manner such that the operation of all the electrical and electronic hardware is slave to the software program.

Another object of the invention is to provide an apparatus as described in the preceding paragraph in which the tire inflation valve is electronically controlled and air flow rate during inflation can be precisely regulated in a manner to minimize total inflation and deflation times.

Another object of the invention is to provide an apparatus as described in preceding paragraphs in which the tire deflation valve is electronically controlled and modulated to provide variable flow rate, so as to permit a higher deflation than normal air flow rate when the tire pressures are higher and gradually reduces to lower but normal flow rates when the tire pressures are lower, thereby substantially lowering the overall deflation times as compared to fixed orifice air flow systems of the character found in the prior art.

Yet another object of the invention is to provide a microprocessor based electronically controlled apparatus that is highly stable and one which will achieve a predetermined tire pressure without hunting, overshooting or undershooting relative to the desired tire pressure thus reducing the overall operation time in both the inflation and deflation modes associated with each tire pressure adjustment.

Another object is to provide an apparatus as described in the proceeding paragraph, which will automatically measure and update the tabulated offset at the end of each pressure adjustment cycle thereby improving the accuracy of the adjusted tire pressure.

Another object of the invention is to set up a dynamic target pressure which is equal to the desired tire pressure plus or minus the offset from the offset table for the corresponding terrain position. The transducer continuously looks at the dynamic target pressure while the system is inflating or deflating and when the transducer pressure reaches the dynamic target pressure, the system shuts off in the dynamic mode. There are no delays as typically experienced using prior art systems and caused by bringing the total system to a stop so that all tires can equalize and the pressure is measured and compared and if these pressures are not equal and most often they are not, the system will start hunting on both sides of the set point until stabilized.

Another object of the invention is to provide an apparatus as described in the preceding paragraph and to establish a method for electronic measurement of the tire pressure that includes a provision for equalizing all tire pressure prior to any measurement but does not utilize a fixed time delay usually 10 seconds or more to equalize all tires before measuring the pressure and thus efficient and reduces the overall time spent for the measurement of tire pressure. Prior art systems that measure tire pressure many times in a single tire pressure adjustment cycle, the cumulative effect of savings in time with the preferred system can be significant.

Another object of the invention is to provide an apparatus of the class described in which inflation of other tires is blocked off if a flat tire is detected and except for the flat tire, all other tires remain isolated from the control system.

Another object of the invention is to have a continuous updating of the offset table by measuring the offset at the end of each pressure adjustment cycle and then comparing the same with the appropriate offset in the table described earlier. If the offsets are different, then to overwrite and replace the previous offset with the last measured offset.

Another object of the invention is to provide repeated calibration of the pressure transducer with respect to the equipment zero. The air cavity in contact with pressure transducer is reduced to atmosphere and the voltage output of the transducer is then measured to establish the zero pressure output.

Yet another object of the invention is to provide an apparatus embodying a multi-channel control system capable of controlling inflation and deflation of several groups of tires with differing pressure settings.

Still another object of the invention is to provide an apparatus of the character described in the preceding paragraph, in which each channel is independently controlled in all its attributes by a common microprocessor without any cross-talk. This technique is also called multiplexing. To demonstrate this independence, it has been observed that at a given moment of time, one channel can effect inflation, another deflation, and a third can check and equalize tire pressure.

DESCRIPTION OF ONE EMBODIMENT OF THE INVENTION

Figure 1:
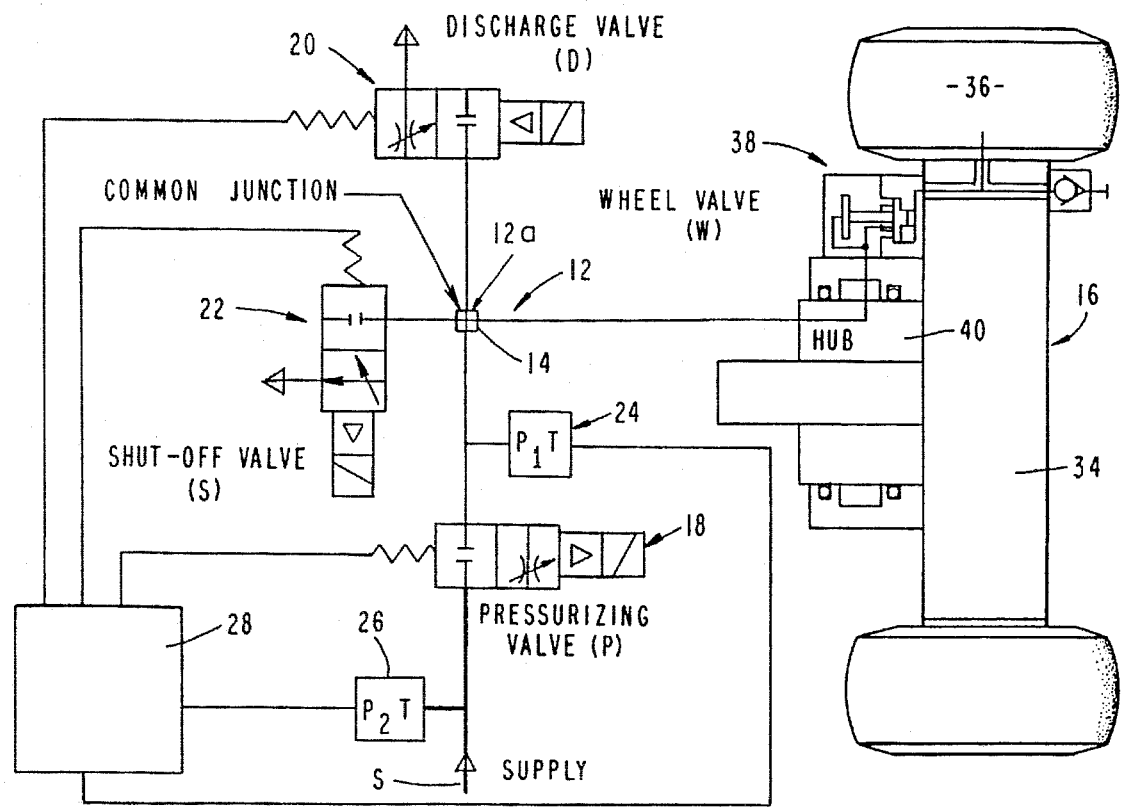
FIG. 1 is a generally schematic view of the apparatus of the invention shown interconnected with one wheel assembly of a vehicle.

Referring to the drawings, and particularly to FIG. 1, one form of the invention is there schematically illustrated. The apparatus is shown in a static mode and can be seen to comprise a manifold assembly generally designated by the numeral 12. The compressor (not shown) is also connected and manifold assembly is operably interconnected with an air supply "s" such as at a common junction 14 with a schematically illustrated wheel assembly generally designated as 16. It is to be understood that, while only a single wheel assembly is shown in the drawings, in actual practice up to eight wheel assemblies can be operably interconnected with the manifold assembly at the common junction 14.

Manifold assembly 12 includes a manifold to which three electronic valves 18, 20 and 22 are connected in a manner to communicate with the chamber of the manifold schematically identified by the numeral 12a. In practice the manifold assembly includes a printed circuit board which acts as an interface between the electronic valves and a controller means which provides appropriate valve actuating signals to the electronic valves. Each of these valves is a two position valve of a standard construction and is readily commercially available. For example, a pilot operated, directional valve sold by Granzow, Inc. is suitable for the present application.

An extremely important aspect of the method of the present invention resides in the fact that these valves, in addition to having the normal open and closed positions can be modulated to provide flow control or a time base custom designed sequence of on and off position at the rate of approximately 30 Hz. to produce a pulsating flow. When the valves are controllably modulated in accordance with the method of the invention, a pulsing or jarring effect is produced on the poppet and sleeves of the associated valve means, or wheel assembly valve which will permit the efficient opening and closing of the valves even if the valves are contaminated and jammed with particulate material such as rubber dust or the like or if the system has been inoperative for a long period of time.

In the form of the manifold assembly of the apparatus shown in FIG. 1, first valve 18 comprises a tire pressurizing valve, second valve 20 comprises a tire deflation valve and third valve 22 comprises a shut-off valve. Also forming a part of the manifold assembly 16 are two transducers 24 and 26 serving at different location of the pneumatic circuit and having entirely different function as identified in the drawings as P1t, and P2t. The purpose of these transducers will presently be described.

Figure 7:
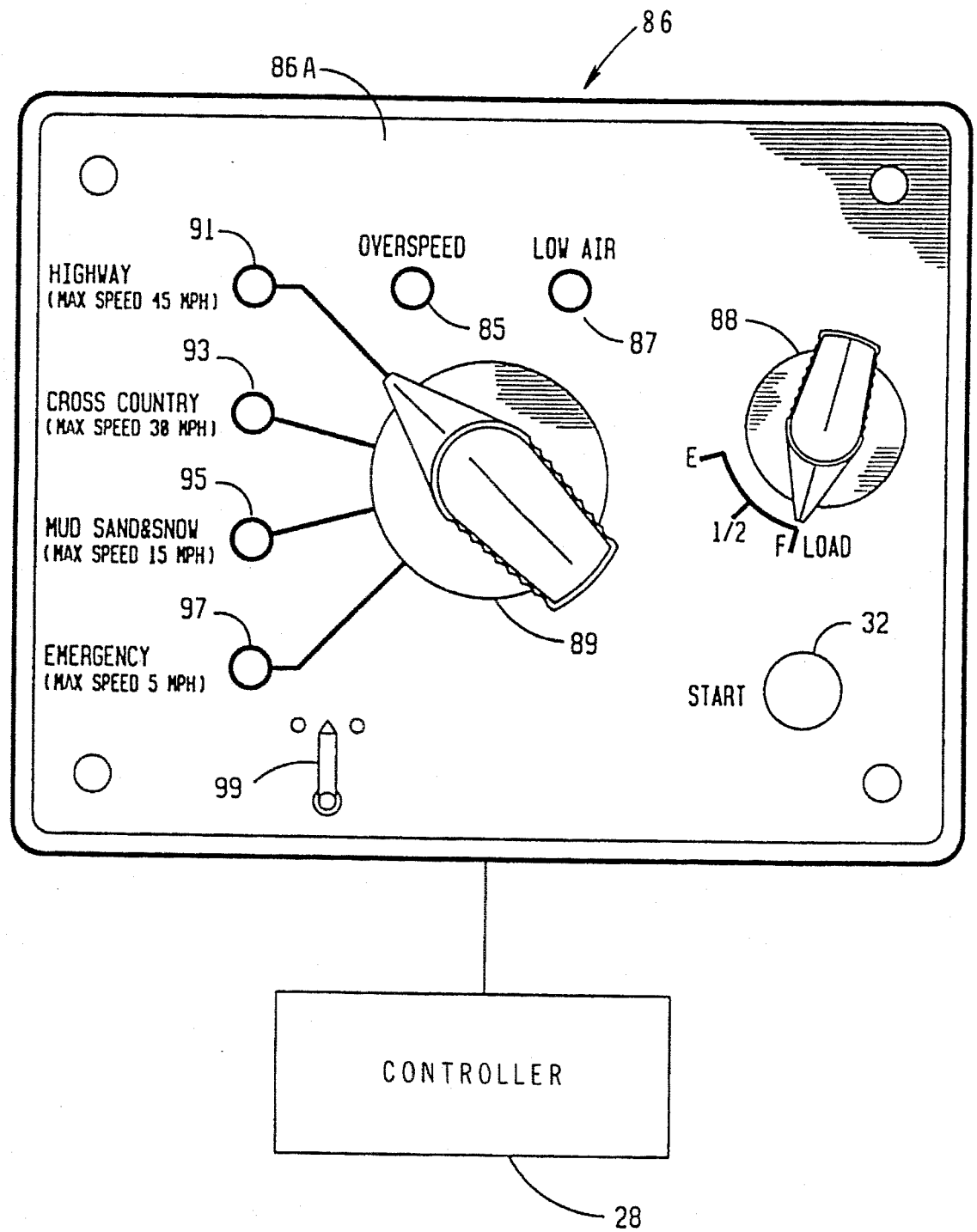
FIG. 7 is a generally diagrammatic view of the cab-mounted control panel of the apparatus of the invention which is operably interconnected with the controller.

Each valve 18, 20, and 22, and each transducer 24 and 26, is electrically interconnected in the manner schematically shown in FIG. 1 with a controller means, here provided as an electronic controller 28. The controller means provides all the electrical and electronic signals necessary to selectively actuate the valves and to read the signals produced by the transducers as determined by the software program loaded on EPROM (erasable programmable read only memory). Controller 28 can take several physical forms, but preferably comprises a microprocessor based electronic digital system, utilizing microprocessor based components including CPU's (central processing unit) such as those marketed as Z 80 series, manufactured by S. G. S. Thompson, EPROM part # TS27C64A also manufactured by S. G. S Thompson, RAM (random access memory) part # HM3-65728 BN-5. Manufactured by Matra Harris, A to D (analog to digital) converter part No MC14504 manufactured by Motorola and other CPU's (central processing units) such as 68 HC11 manufactured by Motorola, that may include in the same chip a RAM (random access memory), EPROM (erasable programmable read only memory) and A to D (analog to digital) converter as an integral parts of the same CPU (central processing unit). As will be discussed in greater detail hereinafter, the input to the controller comprises operator control means including a cab mounted control panel having a rotary switch and appropriate start-stop controls 32 (FIG. 7). When controller 28 includes an appropriate microprocessor, all operations are accomplished using the appropriate software program. The development of such software program is well within the skill of those skilled in the art and since the software program forms no part of the present invention, it will not be discussed in detail here in.

Forming a part of the wheel assembly 16 is a rim 34 upon which a pneumatic tire 36 is mounted. Valve means, shown here as a wheel valve 38, is mounted on rim 34 and is connected to manifold assembly 12 through a rotary hub seal 40 of a character well known to those skilled in the art. One form of such rotary hub seal is described in U.S. Pat. No. 4,782,878. The details of the construction and operation of wheel valve 38 will presently be described. However, at this point it should be noted that the wheel valve of the valve means is internally piloted, embodies a unique, free floating poppet and has no electrical connection with the manifold assembly. Importantly the wheel valve is pneumatically opened by the incoming air under pressure and is instantaneously closed by air pressure decay and an associated venturi effect later to be described which is coupled with the jarring action created by controllably modulating shut-off valve 22.

Figure 5:
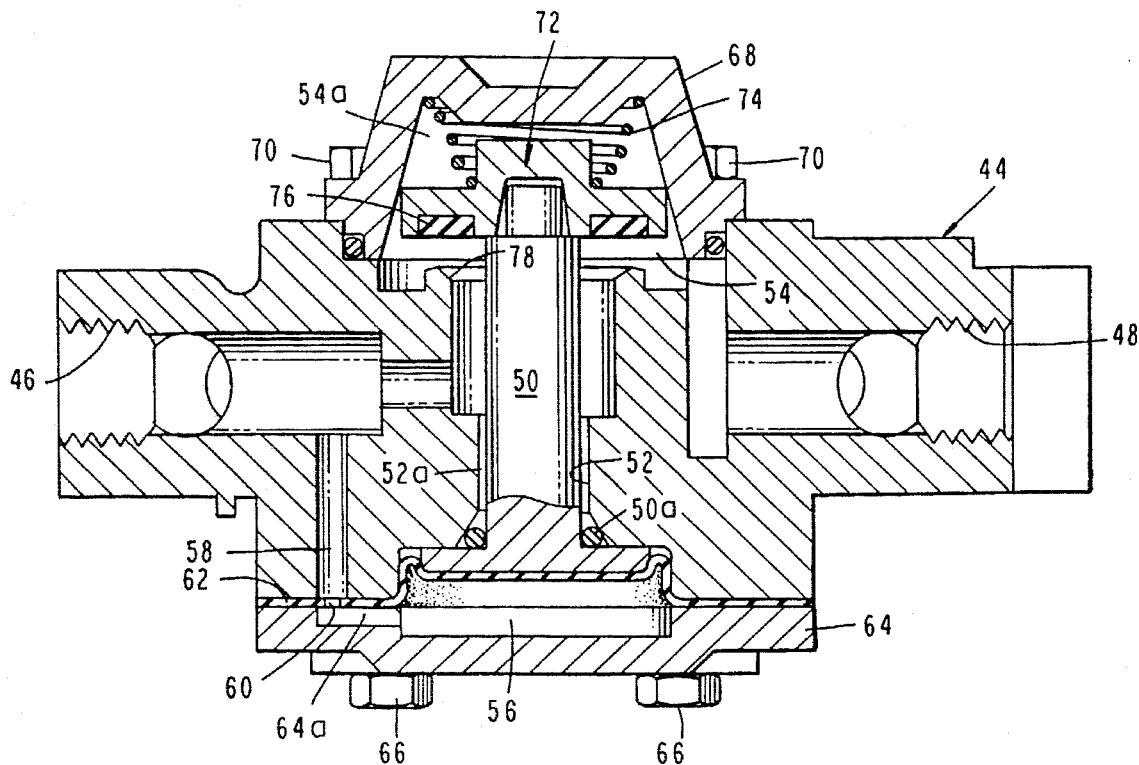
FIG. 5 is a cross-sectional front view of one form of the wheel valve of the apparatus of the present invention.
Figure 6:
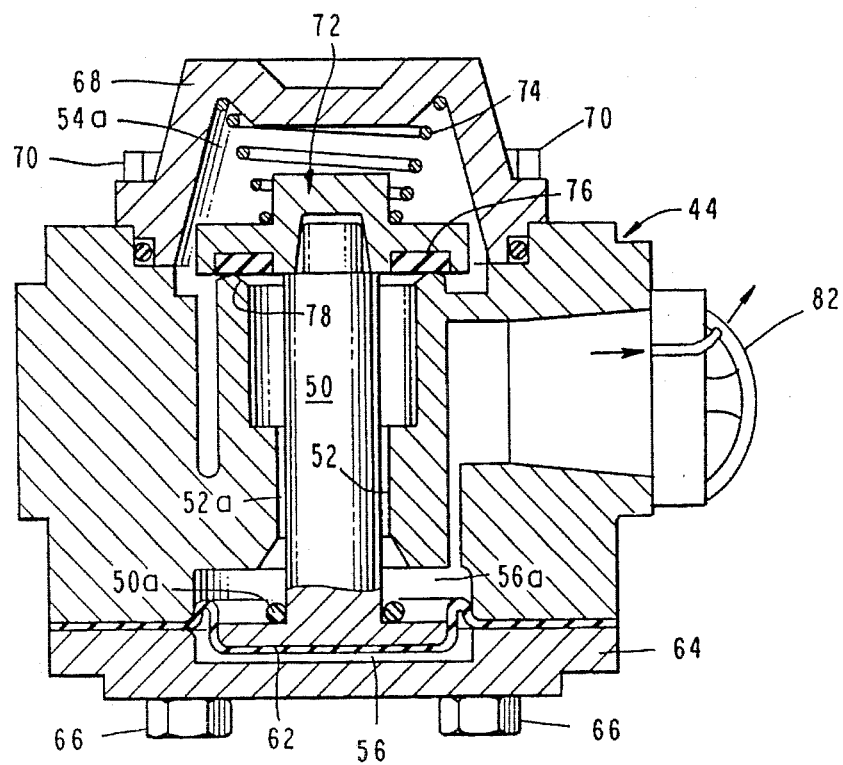
FIG. 6 is a cross-sectional side view of the wheel valve shown in FIG. 5.

Referring to FIGS. 5 and 6, the construction of one form of the wheel valve of the apparatus of the present invention is there illustrated. The wheel valve is an important feature of the present invention in that it is specially designed to reliably operate in a high dust environment and is also uniquely capable of virtually instantaneous closure. In its preferred form, the wheel valve comprises a housing 44 having an inlet passageway 46 and an outlet passageway 48. A piston 50 reciprocates longitudinally within a central bore 52 provided in housing 44. Also formed within housing 44 is an upper chamber 54 and a lower chamber 56. Inlet passageway 46 communicates with chamber 56 via a much smaller passageway 58 and an aperture 60 provided in a one-piece diaphragm 62, the periphery of which is clamped between housing 44 and an end cover 64. End cover 64 is provided with a slot 64a which communicates with the aperture 60 and is interconnected with housing 44 by suitable connectors such as bolts 66. Diaphragm 62, which is constructed from a single piece of any suitable, resiliently deformable sheet of material, extends through chamber 56 and beneath piston 50. Upper chamber 54 is closed to atmosphere by a poppet end cover 68 which is also connected to housing 44 by means of suitable connectors such as bolts 70. Housed within chamber 54 and movable from a first closed position, shown in FIG. 6, to an open position, shown in FIG. 5 is a poppet 72. Poppet 72 is continuously biased toward the closed position shown in FIG. 6 by biasing means provided here in the form of a coiled spring 74. Poppet 72 includes a resiliently deformable sealing member 76 which sealably engages an annular valve seat 78 when the valve is in the closed position shown in FIG. 6. An important feature of the valve design resides in the fact that the poppet 72 freely "floats" within chamber 54, and during the closing stage will tend to "wobble" relative to seat 78. This wobbling action in both a longitudinal and transverse direction, coupled with the modulation of the valve in the manner previously discussed, tends to effectively provide a self-cleaning wiping action between the poppet and the seat. Also a very narrow contact surface between the seat and poppet prevents a particulate contaminates within the air flowing through the valve from building up on the poppet and seat in a manner to prevent positive closing of the valve.

The ratio of the pilot area 56 to the poppet seat area 78 is preferably on the order of two to one. Therefore, when the pressure in lower chamber 56, which is also the pressure applied to diaphragm 62, is approximately one-half the pressure in portion 54a of upper chamber 54(that is the portion of chamber 54 above poppet 72) the valve will move into the open position shown in FIGS. 5 against the urging of spring 74. This will, of course, permit air to flow from inlet passageway 46, passed the valve seat 78, and into outlet passageway 48. As illustrated in FIG. 5, as the piston moves upwardly, air within chamber 56a which accumulates due to leakage across the annular bore clearance 52a between the piston rod and the valve body 44 (FIG. 6), will be efficiently vented to atmosphere via an umbrella-type relief valve seat generally designated in FIG. 6 by the numeral 82. The purpose of exhausting this air to atmosphere is to prevent any unwanted pressure build-up within the chamber 56a which would tend to decrease the actuating force tending to open the valve. The piston movement also positions the O ring 50a to seal off the leakage across the clearance 52a as shown in FIG. 5. This seal-off feature prevents the air from venting to atmosphere for the full duration of the pressure adjustment cycle on a vehicle having eight wheels, the saving is obviously significant enough to affect the total inflation time.

The design of the annular bore clearance 52a between the piston rod and valve body is very critical for proper valve function and a reliable operation at low temperature, as described above the clearance 52a is primarily sized for the sliding action of the piston during the opening and closing of the valve. However, this bore clearance also acts as a leak path for the air from conduit 46 to the chamber 56a and finally escaping to the atmosphere through the check valve 82, as described above. The ratio of pilot to poppet area is about two to one which would require that the pressure in chamber 56 be at least half that of the tire pressure connected to chamber 54 and acting upon the poppet 72. The bore clearance 52a, therefore is controlled in a manner such that the total leakage flow through this clearance is minimized to maintain sufficient air pressure in conduit 46 and in chamber 56 so as to generate enough activating force on the piston rod to lift the poppet 72 off the seat 78 and thus open the valve.

As these valves are required to operate in a low temperature environment of −50° F.(Fahrenheit), any elastomeric seal permanently placed between the piston rod (50) and the bore (52) would harden up sufficiently at low temperature to restrict the movement of the piston rod 50. In order to maintain a free sliding movement of the piston rod 50 in the bore 52, and to minimize the leakage flow as described above, the annulus bore clearance is designed to tight tolerances. Furthermore the sliding surfaces, i.e. the piston rod outer diameter and the bore, are also coated with solid lubricant to minimize frictional drag. Changes in temperature e.g. operation of the vehicles at −50° F. can affect the annular bore clearance due to the shrinkage of the piston rod diameter and the bore 52. In order to maintain a uniform bore clearance throughout the working temperature range, the piston rod 50 and the bore 52 located in housing 44 are preferably made out of the same materials.

The valve is modulated to create a wobbling action of the poppet, as described herein above, the air movement in pilot chamber 56 follows the reciprocal movement of the piston rod. If the frequency of the modulation is same or closer to the natural frequency of vibration of the diaphragm and piston rod combination assembly, the piston rod 50 would tend to resonate. However, the tortuous configuration of the pilot air passage between chamber 56 and conduit 46 that includes a narrow slot 64a, a small aperture 60 and a very long and narrow passage 58, would provide sufficient resistance to air flow so as to dampen the movement of the piston rod. The response of the piston rod and diaphragm as an assembly, to the excitation of the modulating frequency will therefore be much slower due to dampening in a manner such that the piston rod and diaphragm assembly movement will never reach the resonant frequency and thus eliminating resonance.

Another unique feature of the wheel valve, which will be described in greater detail hereinafter, resides in the ability of the valve to close almost instantaneously due to the venturi action created at the mouth of the small passageway 58 as air moves rapidly outwardly through passageway 46. This venturi action creates a vacuum in the upper region of passageway 58 which rapidly exhausts the air from chamber 56 permitting the piston 50 to move rapidly downward.

SYSTEM OPERATION

In response to the software program loaded in EPROM in the electronic controller, there are six different basic modes or operational routines activated by the controller. These modes can be described as; transducer calibration, leak or flat tire detection, pressurization of all tires, electronic measurement of the current tire pressure in accordance with a defined procedure, inflation or deflation of selected tires and finally, the system shut down. Other optional subroutines such as pressure equalization, can be added as needed and certain of these have been described in the paragraphs which follow. Referring to FIG. 1, the transducer 24 calibration scheme will be initially discussed. In this regard, when the start button 32 (FIG. 7) is pushed to start the system, controller 28 sends appropriate signals to the shut off valve 22 causing the valve to close. This, in fact, is a delayed signal sent after 200 milliseconds from start. Within this 200 millisecond time period, the controller measures the output voltage of transducer 24 with the manifold and the cavity wherein the transducer is mounted, at the atmospheric pressure because at this point in time, no signals have been sent by the controller to activate valves and therefore all valves are in their at rest position. The measurement of this output voltage at atmospheric pressure establishes the transducer zero which will be used for all pressure measurement. This value is good for one complete cycle of operation. Each time the start push button is activated to commence a new cycle of operation, this sequence of establishing the transducer zero/equipment zero is repeated and a new zero value is obtained. It can be appreciated that the problem of zero shift or null shift typically encountered by prior art systems is in this way eliminated by re-establishing the transducer zero at the start of each cycle so that it remains current with respect to various environmental factors such as temperature, humidity and altitude.

It is well known to those who practice the art of pressure measurement by transducers, that changes in temperature, humidity of the air and altitude affects the transducer zero also known as the null point. Any shift in the null point directly affects the accuracy of the measurement. Prior art systems which have utilized compensating devices for temperature, altitude or humidity have achieved a very limited improvement in the accuracy and then only with added cost and equipment. The novel system of the present invention uniquely achieves high accuracy by refreshing the null point at the start of every cycle thereby avoiding the addition of costly equipment.

Figure 2:
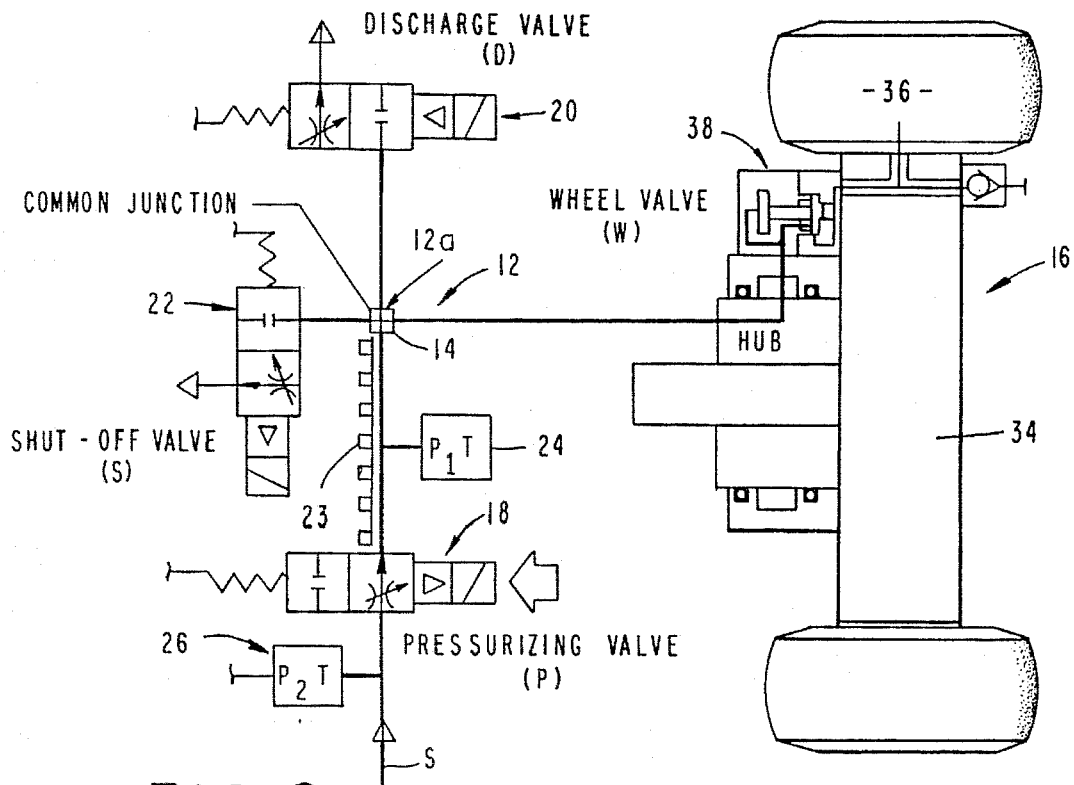
FIG. 2 is a generally schematic view similar to FIG. 1 but showing the pressurizing valve of the device in an open position permitting air to flow through the system toward the vehicle wheel assembly as indicated by the darkened lines in FIG. 2. The square-wave like indicia appearing in FIG. 2 indicates the important modulation of the pressurizing valve of the apparatus to cause a pulsating flow of air toward the wheel assembly of the vehicle.
Figure 3:
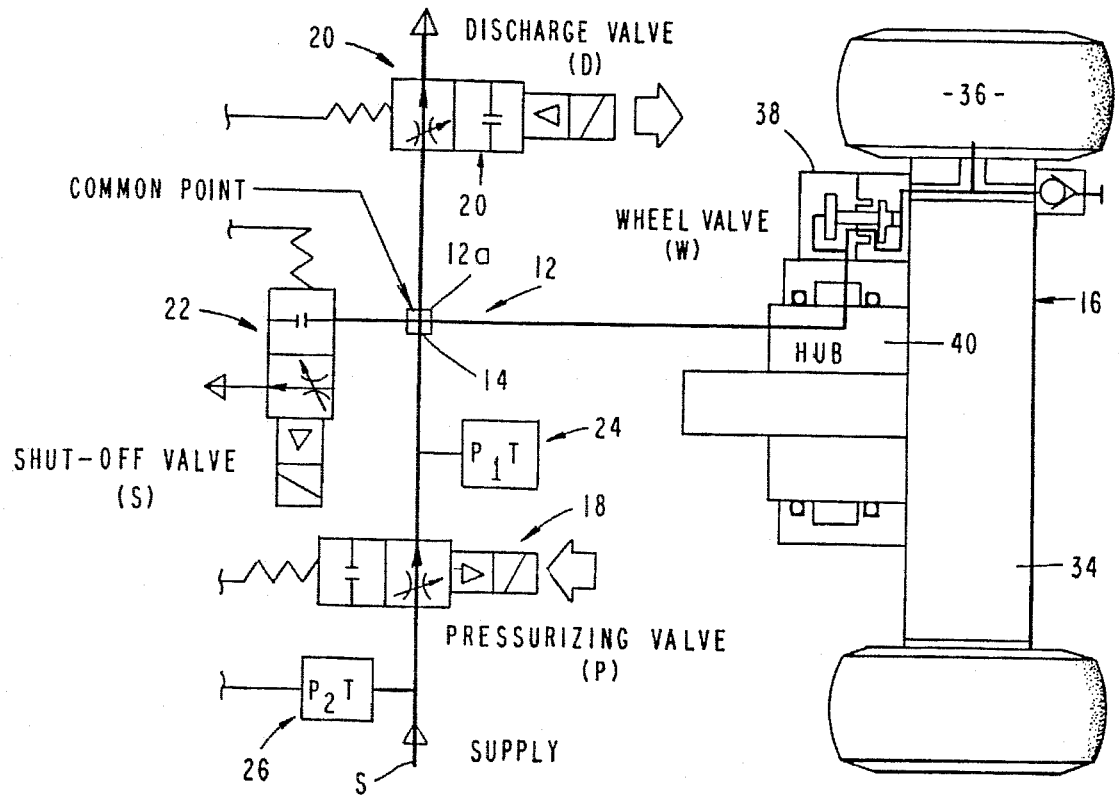
FIG. 3 is a generally schematic view similar to FIG. 2 but showing the opening of the discharge valve of the apparatus to permit tire deflation.

The second leak and flat tire detection subroutine, will now be discussed. Referring to FIG. 1, where the system is shown in its static or shelf position, at the start of the operating cycle, the controller sends an appropriate signal to the shut-off valve 22 causing the valve to close. Next a signal is then transmitted to the pressurizing valve 18 causing it to rapidly modulate between an open and closed position, to provide the air flow in a pre-defined manner. This modulation is schematically illustrated by the square wave form 23 shown in FIG. 2. Normally the modulation is accomplished by energizing the solenoid of the pressurizing valve for about 40 milliseconds to allow this valve to flow air and pressurize all devices and lines connected to the common point 12a including the entrance to the wheel valve 38. This pressure, however, is insufficient to open this wheel valve. Following the passage of the 40 millisecond time period, the solenoid is de-energized to achieve an off time of approximately one second. At the end of the one second off time, the pressure in the system is measured by transducer 24 and is compared to a leak detect rational pressure of 6 PSI. If the pressure sensed by the transducer is below 6 PSI, the controller will repeat another sequence of on-off valve operation and will once again measure the pressure.

It can be appreciated that, should the tire, hub seal or the system plumbing be leaking, the pressure build up at the end of 40 milliseconds will decay during the one second off time. The 40 milliseconds on time and the one second off time have been selected in such a way that the system will not be able to build a pressure of 6 psi in the system in case of a leak.

At the end of the one second off time, if the pressure is still below 6 psi, the controller will continue to pressurize the system with 40 millisecond pulses until the 6 psi threshold is met or, alternatively, a total time of one minute has elapsed. If a pressure of 6 psl is achieved, the system is considered free of leaks and safe enough to go into normal operation in which case the system automatically moves on to the next operational sequence. On the other hand, if the pressure fails to reach 6 PSI during the one minute control period, the system is either considered to be leaking or alternatively that a tire has failed. This is because during each 40 millisecond pressurization period the pressure valve 24 allows a small amount of air to flow into the system. If there is no leak in the system or no tire failure, the pressure in the system will, by definition, reach the 6 PSI level long before the expiration of one minute. Conversely, if there is a leak in the plumbing or if a tire has failed, the small amount of air provided during each 40 millisecond pressurization period will leak out during the following one second off period so that no pressure buildup will result. So long as the leak in the system or in the tire is large enough to prevent a pressure buildup of at least 6 PSI, the system will continue to modulate for the full one minute period. At the end of the one minute period, the sequence will terminate and the controller will automatically flash a fast blinking (as opposed to a continuously lit red light indicating low air) red LED (light emitting diode) 87 on the operator control panel indicating a system leak. (See FIG. 7).

Assuming that the modulating sequence results in a buildup of pressure in the system to 6 PSI, and other operational conditions are normal, the second operational sequence will be commenced by the controller sending a signal to the pressurizing valve 18 to move to a full open position for a period of about one second thereby permitting a very large flow of air toward the wheel valves. The dramatic increase in pressure achieved during this pressurization sequence will cause an increase in pressure within chamber 56 of the wheel valve tending to urge the diaphragm 62 and the piston 50 into the valve open position. When the pressure in the system increases to a level greater than one-half the tire pressure, the diaphragm will move the poppet to the position shown in FIG. 5 thereby opening the wheel valve and permitting the flow of air into passageway 48. At the end of the one second time interval, all wheel valves will have opened and the tires will be connected to the common point or common junction 14 of the system. Because the tires are at a higher pressure than the system, the system pressure will increase instantly and the tires with uneven pressure will inter-flow into each other until the pressure therein is equalized.

It can be appreciated that EPROM (erasable programmable read only memory) that carries the total operational software program for operating this tire pressure adjustment system is easily replaceable and a new software program with different options can be loaded in another EPROM either to add additional operational sequences or to delete some that no longer are required. Pressure equalization is such an operational sequence and is usually applied to applications wherein more than 5 psi pressure difference in tires can exist at any given time.

For applications that generally have no more than 3 PSI pressure variation between tires at any given time, a third basic operational sequence of electronic pressure measurement will commence immediately after the pressurization of all tires and always in lieu of the previously mentioned tire pressure equalization sequence. The objective of the pressure equalization sequence is three fold, (I) to provide equalization of the tires; (II) to measure the system pressure; and (III) to accomplish the measurement of system pressure accurately and in the shortest possible period of time to reduce the pressure measurement time which in turn reduces the overall inflation and deflation time in a given pressure adjustment cycle.

During the tire pressure equalization sequence the tire pressure is measured and logged. After 30 seconds the tire pressure is measured again. If the difference between the first measured pressure and the last pressure is less than ½ PSI, the tires are considered equalized and the apparatus moves into the next sequence. If the tire pressure difference between the first and the last reading is more than ½ psi the system continues to provide 30 second delays with a pressure measurement at the end of the delay until a difference of less than ½ PSI is realized and the tires are considered equalized to move to the next sequence.

After the controller has sent in a signal to the pressurizing valve 18 to move to a full open position for a period of about one second, the controller closes the valve 18 in the manner previously described. At the end of this time period, the controller reads the pressure transducer 24 and logs the reading into a working table in the software program. It continues to read the system pressure from the transducer 24 at 100 millisecond intervals and continues to appropriately log the pressures in the table. As soon as the controller finds three consecutive readings within a difference of ¼ psi, the system pressure is considered to have been equalized and the last reading of the pressure is accepted as representative of the current tire pressure. The savings in time for equalizing and measurement of tire pressure are realized because the pressure is measured so frequently as to terminate the sequence immediately after the actual equalization is completed as opposed to a fixed time delay of say 10 seconds, the period for which the tires will be allowed to equalize.

It can also be appreciated that the time to equalize the tires is a function of the pressure variance between the tires, and usually the tire pressures are substantially equal and it may take no more that a few seconds for equalization to occur. It can therefore be appreciated that the savings with the preferred system of equalization and pressure measurement as distinguished from the fixed time system can be significant.

Next, the current tire pressure is compared to the desired set point. The three possible outcomes of this comparison are evaluated and executed as described herein. If the current tire pressure is same as the desired tire pressure, the system is shut off in the manner described at the end of inflation and deflation cycle. In case the desired tire pressure is higher meaning thereby that the tires need to be inflated, the controller first sets up a dynamic target set point based upon the inflation process which is equal to the desired tire pressure plus the offset value from the offset table corresponding to the appropriate terrain position as previously described.

The controller signals the pressurizing and inflation valve 18 to move to full open position or modulate if supply pressure is low to start inflating tires. Air flow is established from the supply through valve 18 to the common junction 14 and this information is fed back to the controller 28. The controller monitors this feed back of the pressure transducer 24 for the system pressure and when the system pressure reaches the dynamic target set point, the controller signals the valve 18 to shut off, maintains all the valves (#18, 10 and 22) in their current position for approx. 100 milliseconds, measures the pressure transducer 24 again at the end of 100 milliseconds waits and signals the valve 22 to go to open position for a system shut off, in accordance with the procedure previously described which in turn closes off all wheel valves. The pressure in the tires now is equal to the desired tire pressure and the system is no longer hunting for set point up or down as there is no measuring or re-measuring or comparison of the final pressure to the desired tire pressure, as practiced by the prior art. Once a dynamic target pressure is set, the feed back pressure from transducer only has to reach that level, the desired tire pressure has been reached and the controller then executes appropriate signals to shut off the system.

As the tire pressure is being increased, the system is considered to be in the dynamic mode described above. At the end of the 100 milliseconds time period and when the inflation valve 18 has been closed off, there is no more airflow, and the system is considered to be in static mode. While the controller is processing signals to shut off the system, it measures the pressure at the beginning of 100 milliseconds i.e. in the dynamic mode and at the end of the 100 milliseconds i.e. the static mode. The difference of these two pressure measurements is called offset. After measuring the offset the controller replaces the offset for the corresponding and appropriate position with the new measured offset. This last process is called automatic offset update.

With respect to the deflation sequence, following the leak check, should the measured current tire pressure be higher than the desired tire pressure, meaning thereby that the tires need to be deflated, the controller sets up the dynamic target set point based upon the deflation process. This dynamic target set point is equal to the desired tire pressure minus the offset value from the offset table corresponding to the appropriate terrain position previously described. The controller then signals the deflation valve 20 to move into full open position while the pressurizing valve 18 and the shut off valve 22 remain in a closed position. The deflation valve 20 now starts discharging air to the atmosphere at full flow. When the tires have been deflated to approx. half the required change in pressure, the deflation valve 20 starts modulating. For example, if the desired tire pressure is 40 and the current tire pressure before starting deflation is 60 then ½ the required change in pressure is sixty minus forty divided by 2 or 10 psi. In this instance, the deflation valve will start modulating at 50 psi. As the pressure is reduced further, the flow is also gradually reduced by modulation until the dynamic target set point is reached. The actual air flow is about one half that at which the system started at 60 psi. The electronic modulation of the deflation valve 20 has the same effect as the variable orifice where the flow can be regulated to have increased flow at higher pressure and normal flow at lower pressure. The overall effect of the modulation of deflation valve 20 is to reduce the total deflation time for each tire pressure adjustment.

During the deflation process, the transducer 24 continuously measures the pressure at the common point and feeds back to the controller. From this point on, all operations and sequences are exactly the same as for the inflation process, except when the feed back pressure from the transducer 24 is equal to the dynamic target pressure, the controller signals discharge valve 20 to move into closed position. Moreover it is to be noted that the orifice in the discharge valve 20 is appropriately sized to maintain a back pressure in passageway 46 so that the pilot pressure in chamber 56 (FIG. 5) will always be more than one half the pressure in chamber 54a thereby keeping the wheel valve 38 in an open position.

In order to maintain the same back pressure in the passage way 46 and the same deflation time when the number of tires have changed from 4 to 6 or to 8 tires, the orifice in the discharge valve would, of course, have to be increased proportionally. Meaning thereby that the flow needs to be increased proportionally when the number of tires have changed. Other prior art systems that practice flow control typically require a physical change of orifice. However, in the present system the modulating discharge valve 20, which is operated by the electronic controller automatically adjusts to the increased flow requirement without the necessity of changing any orifices in the system.

Figure 4:
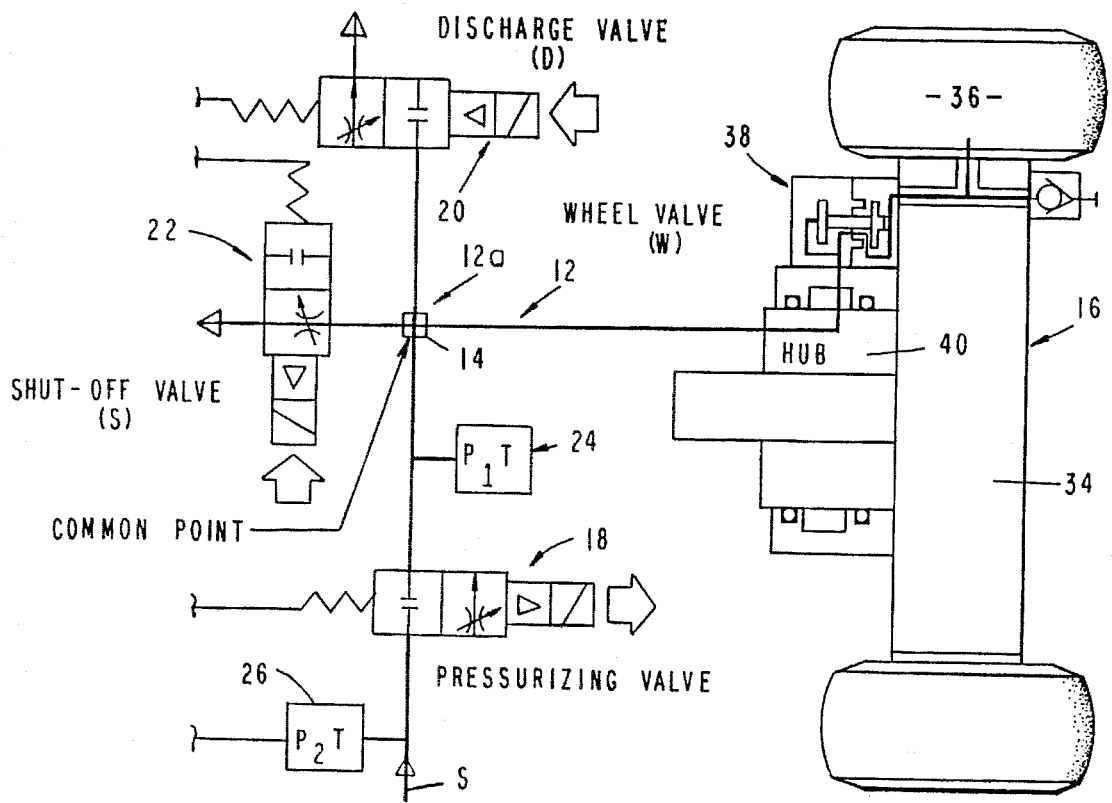
FIG. 4 is a generally schematic view similar to FIG. 3 but showing closing of the discharge valve and the pressurizing valve and opening of the shut-off valve during the shut down sequence of the apparatus of the invention.

Following completion of either an inflate or deflate sequence, the shut-off valve 22, which is of much higher flow capacity than discharge valve 20, is de-energized by the controller and the valve moves into an open position (FIG. 4). This produces a rapid decay of pressure in the system permitting the pilot pressure in the wheel valve to decay freely causing the wheel valve to move into the closed position. The pressure is modulated by the controller in the manner previously described using an on/off sequence with each pulse being about 40 milliseconds in duration. This important step produces a shock, or jarring effect on the poppet which materially assists in the closing action particularly if the valve has become contaminated due to the accumulation of dust or fiber from the sidewalls of the tire during inflation and deflation.

The primary purpose of the second transducer 26 in the system is to provide what is normally termed "air brake priority". More particularly, when the tire pressure adjustment system is in operation transducer PT-2 or 26 constantly monitors the pressure within the air supply system and if at any time a pressure or less than about 85 PSI is detected in the system, the controller sends appropriate signals to the valves to depressurize the entire system and to cause all wheel valves to instantaneously close in the manner previously described. This condition is displayed on the panel mounted within the cab as "low air". For added safety, the separate transducer 26 also functions to continuously monitor the air supply pressure of the system upstream of the pressurizing valve 18 when this valve is in operation. Should the supply pressure drop and the system is in inflation mode, input form this transducer 26 processed through the controller will start modulating the pressurizing valve to reduce the output flow to maintain a supply pressure above 85 PSI. The flow characteristics of the modulation is such that at about 87 PSI the pressurizing valve 18 is modulating to provide a flow about 20% less than the out put of the compressor. This feature prevents the system from a repeated low air priority shut off. This situation is quite common when the vehicles are traveling on street with, frequent starts and stops and the low air compressor output allows the system to drops below 85 PSI quite frequently. Modulating the inflation air flow to reduce the frequent system shut off achieves reduced inflation times under these operating conditions.

As a general rule, prior art systems have been able to adjust tire pressure in response to changing terrain and vehicle speed, but not without changing the vehicle load. Generally speaking an improved traction in softer terrain is in direct proportion to the amount of rubber tire in contact with the ground (also known as tire foot print). For a given terrain, a varying load easily changes this foot print. If a single tire pressure, when used for a given terrain, can only provide the maximum traction for a given load, say full load; as the load is reduced to half, or to empty, the traction will be reduced if the same tire pressure is utilized. It is therefore desirable that the pressure adjustment for each terrain setting should have provision for two additional tire pressure settings marked half load and empty.

In the present system, this amounts to total of twelve tire pressure settings, i.e. four terrain settings times three load settings. The present system being a software program driven system, the tire pressure setting table provides a total of twelve set points by utilizing a row and column arrangement, terrain representing the column and the row representing the load; i.e. full load, half load and empty. The controller software program allows the row setting selection through the rotary switch 88 while the column settings are selectable through rotary switch 89. The combination of these two switch positioning represents one of the twelve tire pressure settings that can be selected by the controller operator.

Turning now to FIG. 8, one form of operator control means is there shown and generally designated by the numeral 86. The operator control means here comprises a panel 86, a terrain select rotary switch 89, a load select rotary switch 88 and a plurality of energizable signal lights indicating the various operating conditions that can be selected by the operator and the required circuit means for interfacing with the controller 28. The electrical connection means, the operator control means, the controller 28 and the electronic valves 18, 20 and 22 are well understood by those skilled in the art and will not be described herein. The "low air" signal light 87 previously discussed is also carried by panel 86. As previously mentioned, the operator control means functions as an input to the controller means and directs the accomplishment of one or more of the operational sequences previously described. By rotating the rotary switch 89, the operator can select any one of four or more groups of tire pressure adjustments which correspond to various vehicle operating conditions and terrains namely highway position indicated by LED 91, cross-country position indicated by LED 93, mud and snow indicated by LED 95 and emergency indicated by LED 97. By turning the rotary switch 88 to any of the three marked positions, the operator can select the tire pressure setting that corresponds to full load, half load or empty. Therefore the combination of the two switches 88 and 89 represents one of the twelve tire pressure settings available, representing both the terrain and load conditions. The apparatus is operated by first switching a toggle switch 99 to the "on" position. The signal LED corresponding to the indicated position of rotary switch 89 will then light up and blink. Next, both the rotary switches 88 and 89 are turned to the desired pressure position and the start button is pushed to commence the operational sequence or pressure adjustment cycle that will provide the tire pressure that is accurate and is achieved in the minimum time for the conditions selected by the operator. The signal LED corresponding to the position of switch 89 will then start blinking to indicate that the system is performing the appropriate operating functions in accordance with the system software program subroutine which has been designed for that operational sequence in a manner well understood by those skilled in the art. The signal LED will continue to blink until the selected pressure adjustment has been completed in the manner previously discussed and the shut-off sequence is completed. The signal light will remain lit after the shut-off to provide a reference for the last completed pressure adjustment.

The controller means also monitors the speed of the vehicle. If safe vehicle operating speeds for the given terrain are exceeded for a time period in excess of one minute, the overspeed LED 85 will start blinking and the controller will signal the system to start and go into inflation mode. One of the four LED's representing the next higher pressure than the current will start blinking. The system will inflate all tires to the next higher tire pressure setting and then shut off both the overspeed LED and the system as described earlier.

Having now described the invention in detail in accordance with the requirements of the patent statues, those skilled in the art will have no difficulty in making changes and modifications in the individual parts or their relative assembly in order to meet specific requirements or conditions. Such changes and modifications may be made without departure from the scope and spirit of the invention, as set forth in the following claims.

I claim:

1. An apparatus operable in atmosphere for adjusting the air pressure within the pneumatic tires of a vehicle having a plurality of tires, comprising:

(a) a source of air under pressure;

(b) a manifold having an inlet in communication with said source of air under pressure, a first outlet in communication with the pneumatic tires and a second outlet in communication with atmosphere;

(c) first valve means disposed between said inlet of said manifold and to said source of air under pressure for controlling air flow between said source of air under pressure and said manifold;

(d) second valve means disposed between said manifold and at least one of the pneumatic tires for controlling air flow between said manifold and the pneumatic tire, said second valve means comprising:

(i) a valve body having a valve seat and first and second chambers;

(ii) a piston reciprocally movable within said valve body relative to said first and second chambers;

(iii) a poppet movable relative to said piston within said first chamber both longitudinally and laterally relative to said valve seat in a wobbling action; and (iv) a resiliently deformable diaphragm connected to said valve body and to said piston for movement with said piston;

(e) third valve means disposed between said manifold and said second outlet for controlling air flow between said manifold and atmosphere;

(f) transducer means for measuring the pressure within said manifold and for generating a signal corresponding to the measured pressure, said manifold being in fluid communication with said first, second and third valve means and with said transducer means; and (g) control means connected to said transducer means, and to said first and third valves for receiving said signals generated by said transducer means and for operating said first and third valves in response to said signals in a manner such that said first valve is modulated so as to cause discrete pulses of air under pressure to be controllably directed toward said second valve means.

2. An apparatus operable in atmosphere for adjusting the air pressure within the pneumatic tires of a vehicle having a plurality of tires, comprising:

(a) a source of air under pressure;

(b) a manifold having an inlet in communication with said source of air under pressure, a first outlet in communication with the pneumatic tires and a second outlet in communication with atmosphere;

(c) first valve means disposed between said inlet of said manifold and to said source of air under pressure for controlling air flow between said source of air under pressure and said manifold;

(d) second valve means disposed between said manifold and at least one of the pneumatic tires for controlling air flow between said manifold and the pneumatic tire, said second valve means comprising:

(i) a valve body having a valve seat and first and second chambers;

(ii) a piston reciprocally movable within said valve body relative to said first and second chambers and sealably movable between the second chamber and the atmosphere and said piston being guided through a narrow bore forming a non-resilient and low-leakage seal;

(iii) a poppet movable relative to said piston within said first chamber both longitudinally and laterally relative to said valve seat in a wobbling action;

(iv) a resiliently deformable diaphragm connected to said valve body and to said piston for movement with said piston; and (v) a pilot passage of tortuous design connecting the second chamber and the pilot chamber formed between the valve body and the deformable diaphragm;

(e) third valve means of a first flow capacity disposed between said manifold and said second outlet for controlling air flow between said manifold and atmosphere;

(f) fourth valve means of a second flow capacity, said fourth valve means being disposed between said manifold and said second outlet for controlling air flow between said manifold and atmosphere, said second flow capacity being larger than said first flow capacity;

(g) transducer means for measuring the pressure within said manifold and for generating a signal corresponding to the measured pressure, said manifold being in fluid communication with said first, second and third valve means and with said transducer means; and (h) control means connected to said transducer means, and to said first, third and fourth valves for receiving said signals generated by said transducer means and for operating said first, third and fourth valves in response to said signals in a manner such that said first valve is modulated so as to cause discrete pulses of air under pressure to be controllably directed toward said second valve means.

* * * * *